United States Patent

Ver

[11] Patent Number: 6,160,892
[45] Date of Patent: Dec. 12, 2000

[54] ACTIVE MUFFLER

[75] Inventor: Istvan L. Ver, Lexington, Mass.

[73] Assignee: BBN Corporation, Burlington, Mass.

[21] Appl. No.: 08/850,036

[22] Filed: May 2, 1997

Related U.S. Application Data

[63] Continuation-in-part of application No. 08/665,391, Jun. 18, 1996, abandoned, which is a continuation of application No. PCT/US94/14956, Dec. 28, 1994, which is a continuation-in-part of application No. 08/176,102, Dec. 30, 1993, abandoned.

[51] Int. Cl.[7] .......................... A61F 11/06; G10K 11/16; H03B 29/00
[52] U.S. Cl. ..................... 381/71.5; 381/71.1; 381/71.4
[58] Field of Search ................................. 381/71.5, 71.1, 381/71.2, 71.4, 71.7, 94.1

[56] References Cited

U.S. PATENT DOCUMENTS

| | | |
|---|---|---|
| 2,810,449 | 10/1957 | Coleman . |
| 2,983,790 | 5/1961 | Olson . |
| 3,688,865 | 9/1972 | Smith . |
| 3,710,617 | 1/1973 | Andersen . |
| 4,044,203 | 8/1977 | Swinbanks . |
| 4,091,892 | 5/1978 | Hehmann et al. . |
| 4,100,993 | 7/1978 | Feder . |
| 4,489,441 | 12/1984 | Chaplin .................................. 381/71.1 |
| 4,665,549 | 5/1987 | Eriksson et al. ........................ 381/71.5 |
| 4,753,319 | 6/1988 | Vinciguerra . |
| 5,060,271 | 10/1991 | Geddes ................................... 381/71.5 |
| 5,088,575 | 2/1992 | Eriksson . |
| 5,097,923 | 3/1992 | Ziegler et al. .......................... 181/206 |
| 5,119,902 | 6/1992 | Geddes . |
| 5,257,316 | 10/1993 | Takeyama .............................. 381/71.5 |
| 5,272,286 | 12/1993 | Cain ....................................... 381/71.5 |
| 5,511,127 | 4/1996 | Warnaka ................................ 381/71.5 |
| 5,513,266 | 4/1996 | Zuroski .................................. 381/71.5 |

FOREIGN PATENT DOCUMENTS

| | | |
|---|---|---|
| 0483921 | 5/1992 | European Pat. Off. . |
| 4027511 | 10/1991 | Germany . |

OTHER PUBLICATIONS

D. Guicking et al. "An Active Sound Absorber With Porous Plate", Jul. 1984, vol. 106 Journal of Vibration, Acoustics, Stress, and Reliability in Design, pp. 389–392.

C. J. Radcliffe et al., "Development Of An Active Acoustic Sink (AAS) For Noise Control Applications",DE–vol. 75, Active Control of Vibration and Noise ASME 1994, pp. 43–50.

D. Thenail et al. "Absorption By An Actively Enhanced Material", DE–vol. 75, Active Control of Vibration and Noise ASME 1994, pp. 441–448.

*Primary Examiner*—Minsun Oh Harvey
*Attorney, Agent, or Firm*—Leonard Charles Suchyta; Floyd E. Anderson; James K. Weixel

[57] ABSTRACT

In the active muffler disclosed herein, a porous flow resistive member defines a wall of a duct carrying a noisy flow, e.g., a jet exhaust. The flow resistive member is characterized by having a flow resistance substantially less than ρc, the characteristic impedance of the acoustic medium. Loudspeakers in a chamber on the side of said porous member opposite the duct are actuated to reduce acoustic pressure in the region between the porous member and the loudspeaker, thereby increasing the acoustic flow through the porous member which in turn increases the dissipation of acoustic energy in the duct. The apparatus is particularly effective at low frequencies where a passive dissipative muffler would be of impractical size.

23 Claims, 10 Drawing Sheets

ACTIVE MUFFLER

RELATED APPLICATIONS

The present application is a continuation-in-part of U.S. Ser. No. 08/665,391, filed Jun. 18, 1996, which is now a continuation of, PCT Application No. PCT/US94/14956, filed Dec. 28, 1994 a continuation-in-part of U.S. Ser. No. 08/176,102 filed Dec. 30, 1993, now abandoned.

BACKGROUND OF THE INVENTION

The present invention relates to acoustic silencers or mufflers and more particularly to a silencer which can efficiently dissipate low frequency acoustic energy. One of the many possible applications is in jet exhaust silencers. Though the invention is described primarily in its embodiment for jet engine test cell exhaust silencer, it is understood that it can be applied as well to inlet and discharge silencers for any kind of noise sources with substantial low frequency sound output such as gas turbines, HVAC and industrial fans, internal combustion engines, etc.

For out-of-airframe testing, jet engines are typically mounted in a test cell and for in-airframe in a Hush House where the jet exhaust is directed through a discharge muffler to reduce the acoustic energy released into the environment. Conventional passive exhaust silencers, however, are deficient at low frequencies where the input impedance of a practically sized absorptive liner would becomes so large that it impedes acoustic flow through the liner.

While active sound cancellation technologies have been developed for various duct environments, e.g., HVAC distribution systems, the conventional approach of generating a cancelling wave is not readily adaptable to the jet engine exhaust problem or to any other application where the flow velocity in the passage is high enough to interfere with the sensing of the approaching sound wave. Firstly, the jet exhaust environment is hostile in the sense that there is substantial heat and turbulence in the exhaust and corrosive gases are present. Similarly hostile environments exist in many other applications such as gas turbine, internal combustion engines and power plant exhaust applications. Accordingly, direct interfacing of sensing and driver transducers to the exhaust duct is not practical. Further, previously known active acoustic attenuation systems accomplish the attenuation of sound by the introduction, into the duct or passage, of a cancelling sound which is ideally a mirror image of the incoming undesirable sound. This cancels the sound downstream of the cancelling sound source and introducing a new sound wave that propagates in the upstream direction. However, if the source of the unwanted sound does not absorb the upstream-propagating sound and there is no effective dissipative section between the noise source and the cancelling driver transducer, the sound energy can build up to a high level in the duct upstream of the cancelling transducer. This results in a large difference in sound pressure across the active silencer section but only a much smaller reduction of the sound propagating downstream.

Among the several objects of the present invention may be noted the provision of novel apparatus for reducing acoustic energy in a duct; the provision of such apparatus which provides improved reduction of acoustic energy at low frequencies as compared with conventional mufflers; the provision of such apparatus which can substantially reduce the low frequency sound energy of jet exhausts, gas turbines, HVAC and industrial fans, internal combustion engines and other sources of noise which contain high intensity low frequency components; the provision of such apparatus which employs an active system to increase dissipation of acoustic energy; the provision of such apparatus where neither the sensors or actuators employed are directly exposed to the flow; the provision of such apparatus which does not generate increased sound energy build up in the upstream portion of a duct; the provision of such apparatus which is highly reliable and which is of relatively simple and inexpensive to construct. Other objects and features will be in part apparent and in part pointed out hereinafter.

SUMMARY OF THE INVENTION

In accordance with the present invention, a member defines at least one wall of a duct in which acoustic energy is to be reduced. The member has an acoustic wall impedance with an essentially frequency independent resistive real part and essentially zero imaginary part. The word "resistive" in its subsequent uses implies any material configuration that provides an essentially resistive acoustic impedance. The flow resistive member is characterized by having a flow resistance which in most cases of practical interest is substantially less than $\rho c$, the characteristic impedance of the acoustic medium. The specific choice of flow resistance depends on the volume displacement capabilities of the transducer, on the extent of the required protection of the sensors and actuators from heat and turbulence and on the degree of desirable decoupling of the transducer/sensor assemblies from each other and from reflections from upstream and downstream duct discontinuities. The flow resistance of about 0.3 $\rho c$ frequently represents a balanced compromise between conflicting requirements. However, any value in the range of 0.1 to 2.0 $\rho c$ can be used. The duct guides a flow and the sound field. A chamber is provided on the side of the resistive member opposite the duct and a partition divides this chamber into a first or front portion adjacent the resistive member and a second or back portion separated from the resistive member. An acoustic driver transducer is mounted in the partition and a sensing transducer responds to acoustic pressure in the first portion of the chamber, i.e., the space between the driver transducer and the resistive member. A controller responds to the sensing transducer for actuating the driver transducer in a sense which, in the frequency region of interest, reduces acoustic pressure variation in the first portion of the chamber to practically zero at value and thereby maximizes acoustic flow through the resistive member and thus increases dissipation of acoustic energy in the duct. It is an important feature of the invention that the sound pressure behind the resistive layer is reduced to a small fraction of its uncontrolled valve so that the particular phase of residual sound pressure, which remains after the control is applied is unimportant. This allows the use of a simple, robust control system which is in contrast to the highly complex and much less robust control system which would be needed to achieve a frequency-dependent, phase-correct complex impedance behind the resistive layer to achieve high sound attenuation by a combination of reflection and dissipation.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
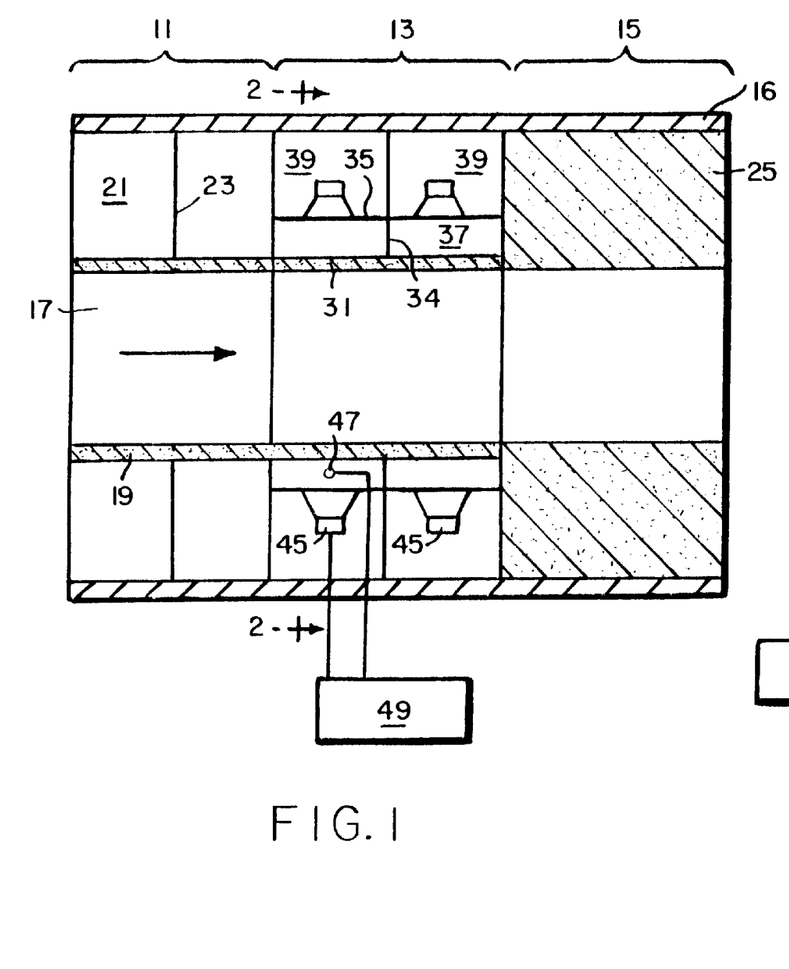
FIG. 1 is a side view, in section, of a jet exhaust muffler of round cross section including an active section constructed in accordance with the present invention.
Figure 2:
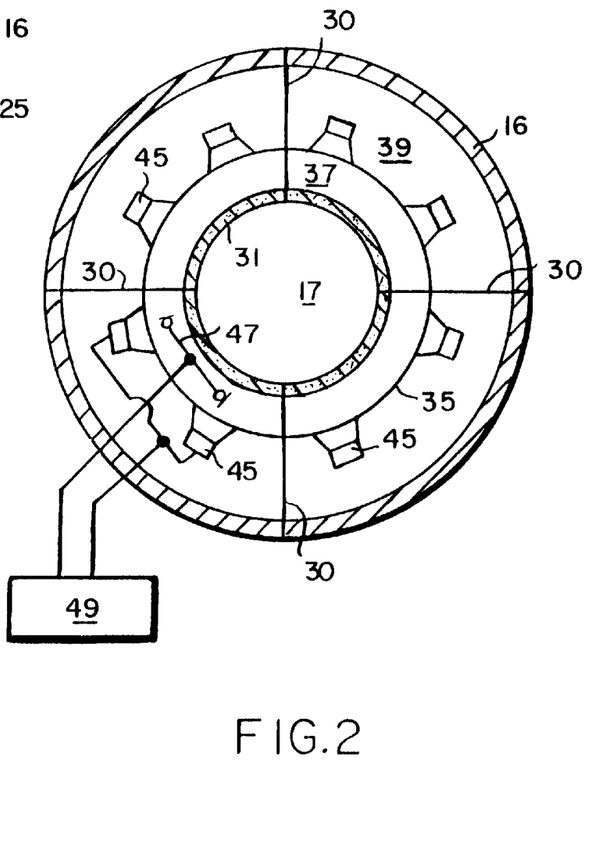
FIG. 2 is an axial view, in section, of the muffler taken substantially on the line 2—2 of FIG. 1.

The jet exhaust muffler illustrated in FIGS. 1 and 2 employs three successive sections 11, 13 and 15 each of which is of generally circular cross section. Mufflers with oval or rectangular cross section can also embody the invention. Each section has an impervious outside shell, designated by reference character 16. There is a passage 17 through the center of each of the sections and, in the subsequent description, it is assumed that both the flow and the sound field such as a jet engine exhaust is introduced from the left of the apparatus as seen in FIG. 1. In inlet muffler application the direction of sound propagation and flow are opposite. This does not affect the sound attenuation performance of the active silencer section. The sections 11 and 15 are passive and are essentially conventional, illustrated here only to show how to combine passive and active silencer sections, while the section 13 employs active feedback as described in greater detail hereinafter.

The first section 11 employs a relatively thin resistive layer 19 constituting the wall of the passage space 17 and has an air space 21 behind the layer 19. Preferably the air space 21 is axially partitioned as indicated at 23. The third section 15 has a homogenous sound absorbing liner 25, usually of porous or fibrous material, filling the entire space between the duct passage 17 and the outside shell 16. The lengths of the sections 11 and 15 are selected to provide the degree of attenuation desired for the mid and high frequency sounds in accordance with conventional design practices. However, as noted previously, these conventional designs cannot, in a reasonable space, provide the desired attenuation of low frequencies, e.g., frequencies in the range of about 10–80 Hz in the case of a jet engine exhaust and 31 to 125 in the case of HVAC duct silencers. The practice of the present invention however provides a substantial improvement in attenuation in this low frequency range.

Like the initial section 11, the active section 13 employs a relatively thin resistive layer 31 constituting the wall of the duct 17 with an axially and radially partitioned air space behind it. The axial partition in FIG. 1, oriented in planes perpendicular to the duct axis are to inhibit axial propagation of sound, are designated by reference character 34. The radial partitions in FIG. 2, oriented in planes parallel to the duct axis are to inhibit circumferential propagation of sound, are designed by reference character 30. In accordance with an important aspect of the present invention, the layer 31 is characterized by having a flow resistance which is substantially less than ρc, the characteristic impedance of the acoustic medium. The flow resistance is preferably about 0.3 ρc which provides an advantageous balance between absorption and reflection and protection of the sensors and transducers from heat and turbulence. However, any value in the range of 0.1 to 2.0 ρc can be used. As is understood, ρ is the density of the gas and c is the speed of sound in the gas.

The resistive material in the layer 31 may, for example, be constituted by fiberglass or mineral wool. In some applications, a stainless steel wool, porous ceramic, fiber metal, perforated plate with 1% to 7% open area or any layer of material that provides an essentially resistive impedance may also be appropriate.

The air space behind the resistive layer 31 is also partitioned circumferentially by a circumferential partition member 35 which divides each axial section of the air space into a first or front volume or portion 37 which is adjacent the resistive member 31 and a second or back volume of portion 39 which is spaced or separated from the porous resistive member 31. The second or back volume 39 may be partially or fully filled with sound absorbing material to reduce its dynamic stiffness at low frequencies and to prevent standing wave acoustic resonances at mid and high frequencies.

Mounted in circumferentially spaced apertures in each of the circumferential partition member sections 35 are a series of acoustic driver transducers such as loudspeakers 45 which are operated as described hereinafter. One or more microphones 47 are provided for sensing the acoustic pressure in the front portion 37 of the annular chamber surrounding the porous member 31.

As is described in greater detail hereinafter, a controller, designated by reference character 49, responds to the signals obtained from the microphone 47 actuate the loudspeakers 45 in a sense which reduces acoustic pressure in the front volume 37. In effect, this action reduces the impedance of the front volume 37. Conversely stated, the feedback action increases the compliance of the air space of volume 37 making it appear as a larger volume to acoustic waves traversing the resistive layer 31. The consequence of this reduced impedance or increased compliance is to increase the acoustic flow velocity through the resistive liner and to thereby increase the dissipation of acoustic energy.

It should be noted that the controller is operated simply to reduce or minimize the acoustic pressure in the volume 37 as opposed to attempting to generate a complex impedance as would be required to implement a theoretically ideal absorber.

It should thus be understood that an important aspect of the present invention is the obtaining of increased acoustic energy dissipation within the resistive layer 31, balanced with the generation a reflected wave which propagates along the duct 17. A further advantage of this arrangement is that the sensors (microphones) 47 and the actuators (loudspeakers) 45 are not directly interfacing the duct 17 but, rather, are separated therefrom by the resistive layer 31. As will be understood, the resistive layer 31 in addition to dissipating low frequency sound energy, provides for the microphone and loudspeaker insulation from the heat and the turbulence which may be present in the passage 17 and, as a passive liner, also reduces the mid and high frequency components of the acoustic energy field. In addition, the resistive liner 31 renders the front cavity 37 highly sound absorptive. Consequently, the transfer function implemented by the controller 49 is considerably simplified.

As will be understood, it may be appropriate to introduce a cooling air flow into the volume 37. Since the pressure within the duct passage 17 is typically lower than ambient, due to the velocity of the jet exhaust, the cooling air flow will be naturally aspirated through the porous wall 31. Local cooling by heat exchangers placed in the back cavity 39 or mounted directly on the body of the driver transducer may be employed to cool the driver transducers.

Figure 3A:
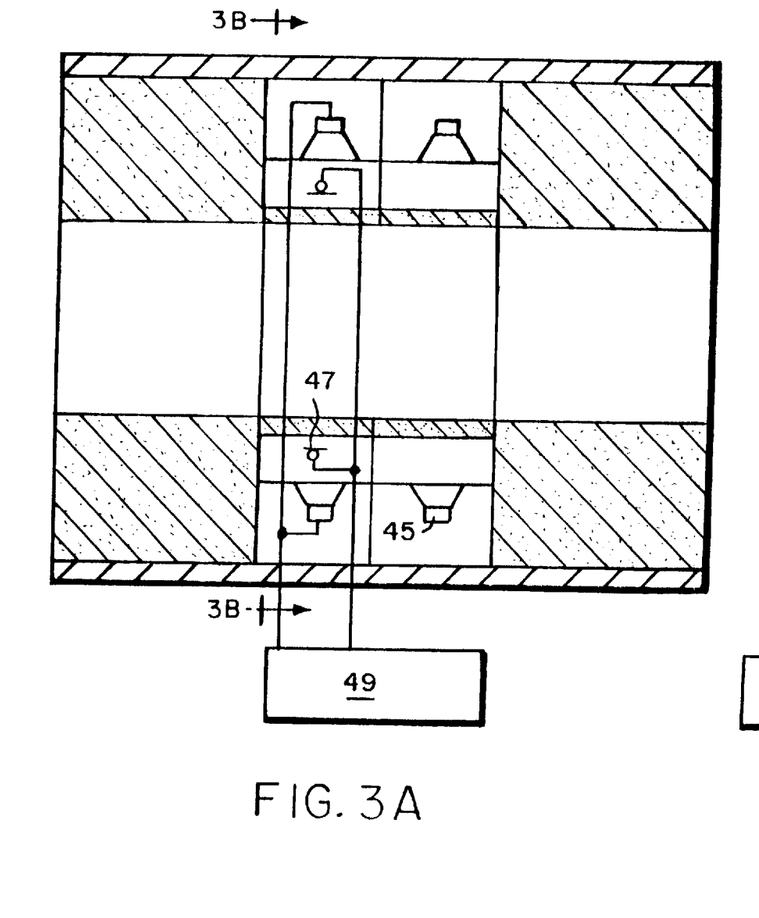
FIGS. 3A and 3B are views illustrating a muffler constructed in accordance with the present invention utilizing feedback controllers of the single input, single output (SISO) type.
Figure 3B:
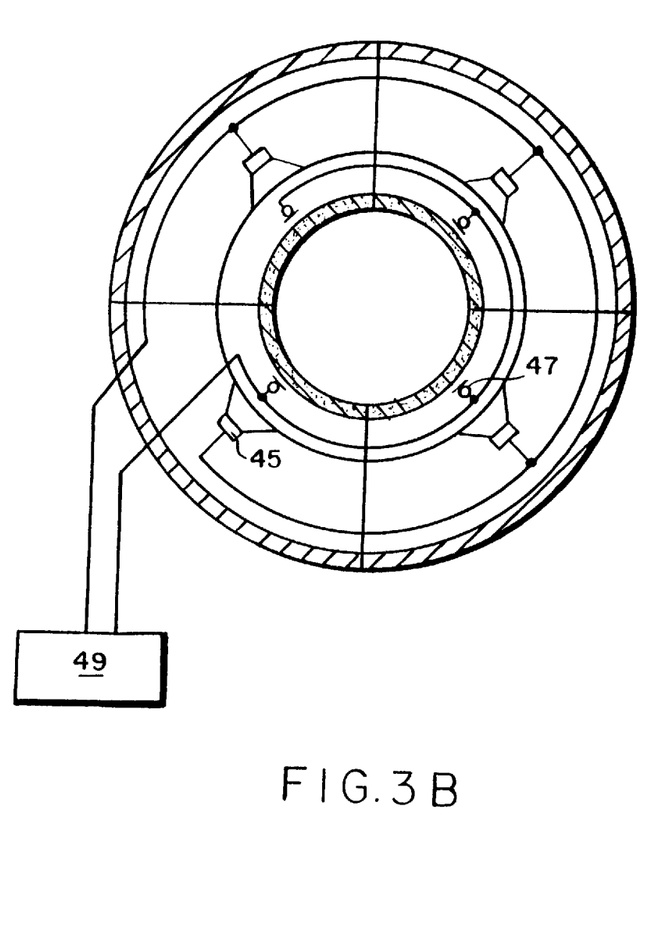
Figure 4A:
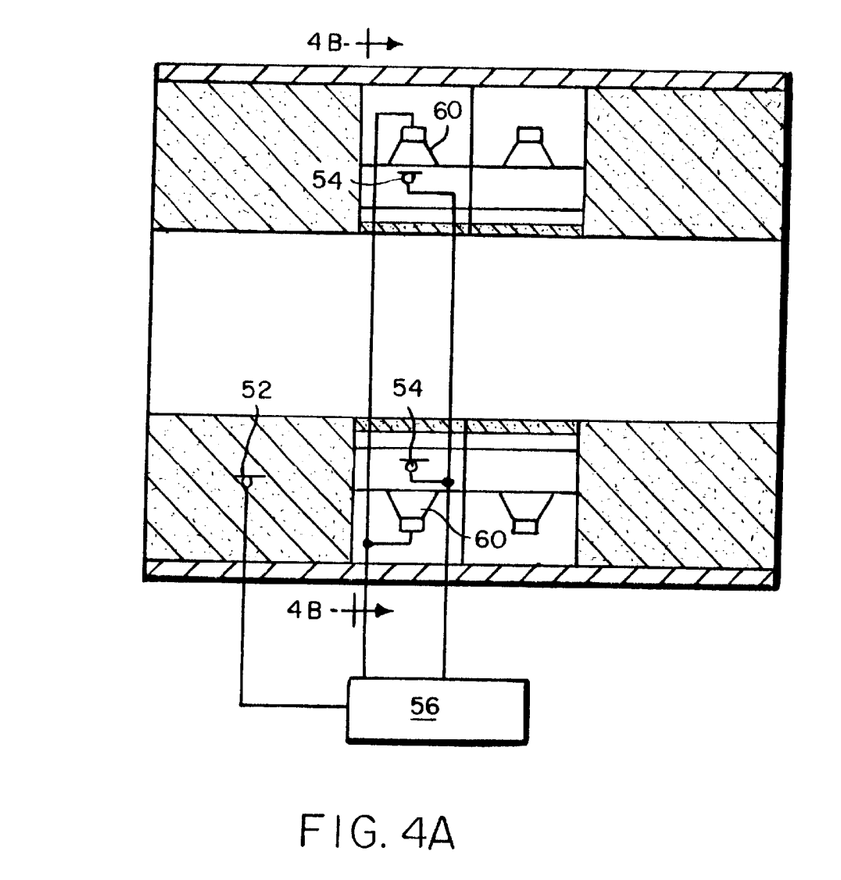
FIGS. 4A and 4B are views illustrating a muffler constructed in accordance with the present invention utilizing feedforward controllers of the single input, single output (SISO) type.
Figure 4B:
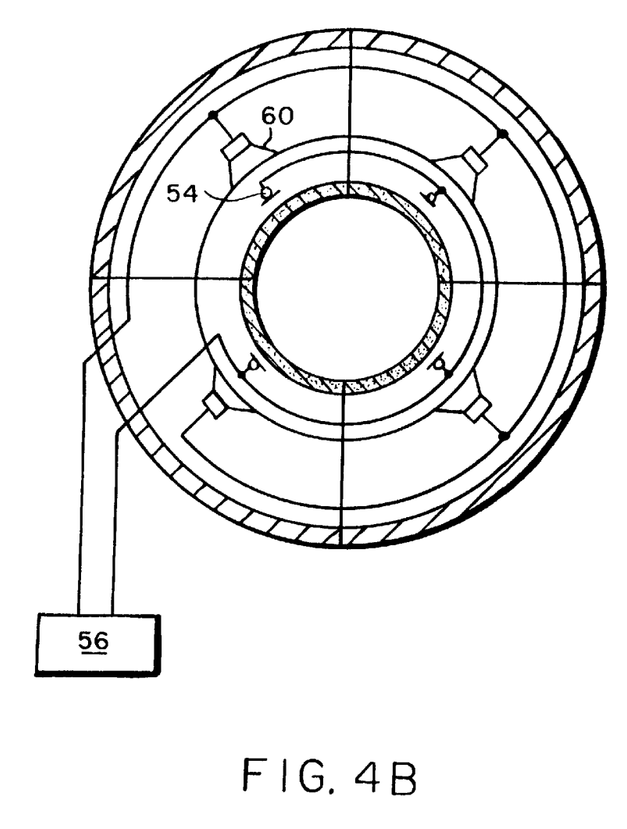
Figure 5A:
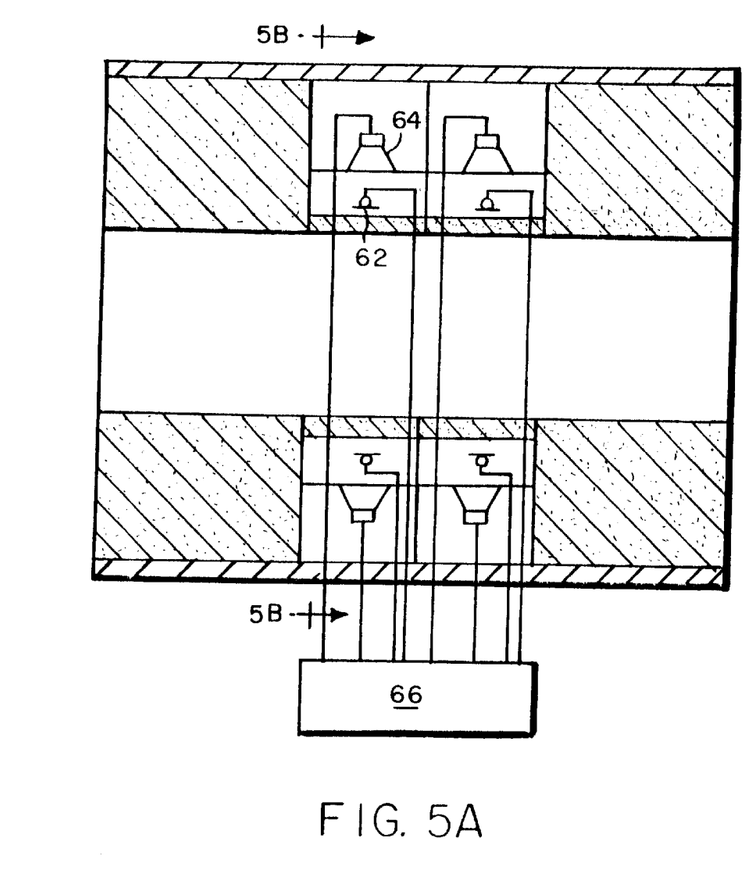
FIGS. 5A and 5B are views illustrating a muffler constructed in accordance with the present invention utilizing feedback controllers of the multiple input, multiple output (MIMO) type.
Figure 5B:
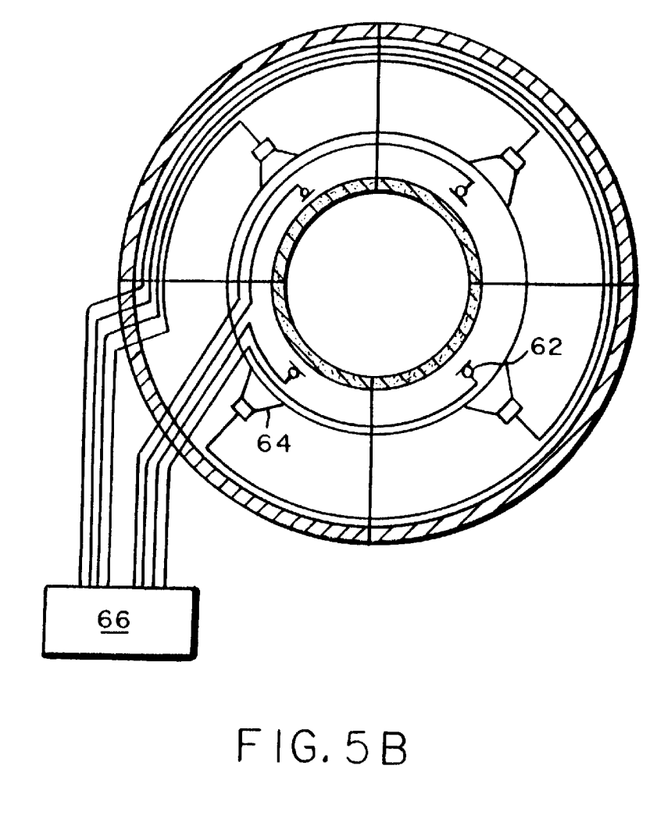
Figure 6A:
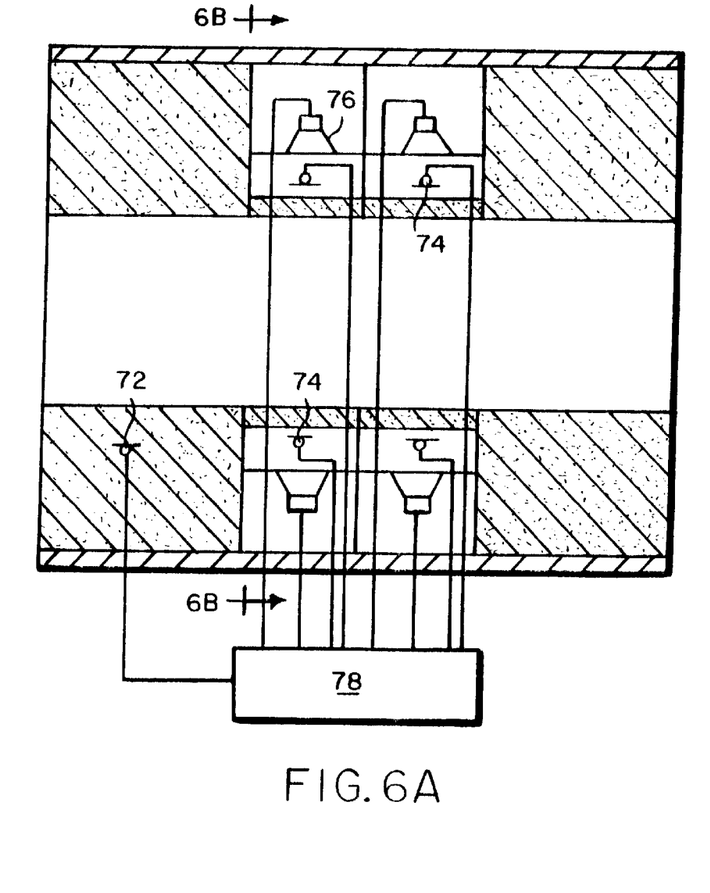
FIGS. 6A and 6B are views illustrating a muffler constructed in accordance with the present invention utilizing feedforward controllers of the multiple input, multiple output (MIMO) type.
Figure 6B:
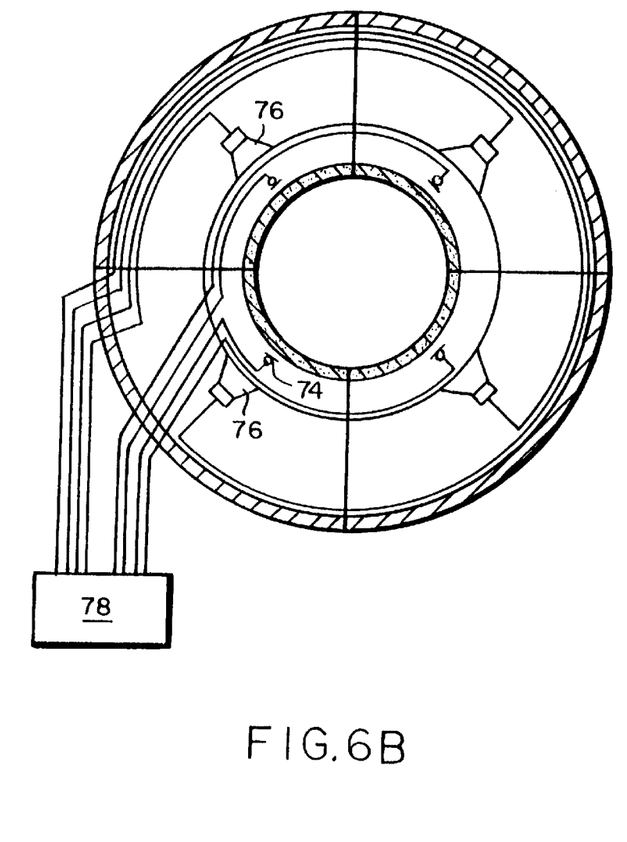

While a separate controller may be provided for each grouping of sensors and actuators, other control configurations may be implemented. Single input/single output (SISO) arrangements are particularly suitable for the control of propagating plane waves and certain higher order modes in which the sound pressure tends to be axially symmetric. Multiple input/multiple output (MIMO) arrangements are suitable for the control of higher order unsymmetrical modes and for situations in which the acoustic coupling of various actuators and sensors degrades system performance. FIGS. 3A and 3B show an example of a single input/single output (SISO) feedback arrangement in which sensor microphones and speakers are each connected in parallel. FIGS. 4A and 4B show an example of a SISO feedforward control system in which all of the speakers 60 are wired in parallel, a reference microphone 52, or other suitable sensor is used to detect the propagating sound signal and an error microphone or microphones 54 are used to adjust the parameters of controller 56. FIGS. 5A and 5B illustrate an example of a multiple input/multiple output (MIMO) feedback arrangement in which the sensor 62 and actuator 64 for each segment is separately connected to the controller 66. This system automatically accounts for the cross coupling among the sensors and actuators. This arrangement is particularly advantageous when there are axially successive active sections since the downstream sections face only a reduced sound pressure and the influence of more heavily driven upstream speakers may be significant. FIGS. 6A and 6B show an example of a MIMO feedforward system. Several sensors 72 may be used to measure input sound signals while several other sensors 74 measure error signal levels. Each driver transducer 76 is separately driven and the controller 78 accounts for the cross coupling among sensors and actuators.

Figure 7:
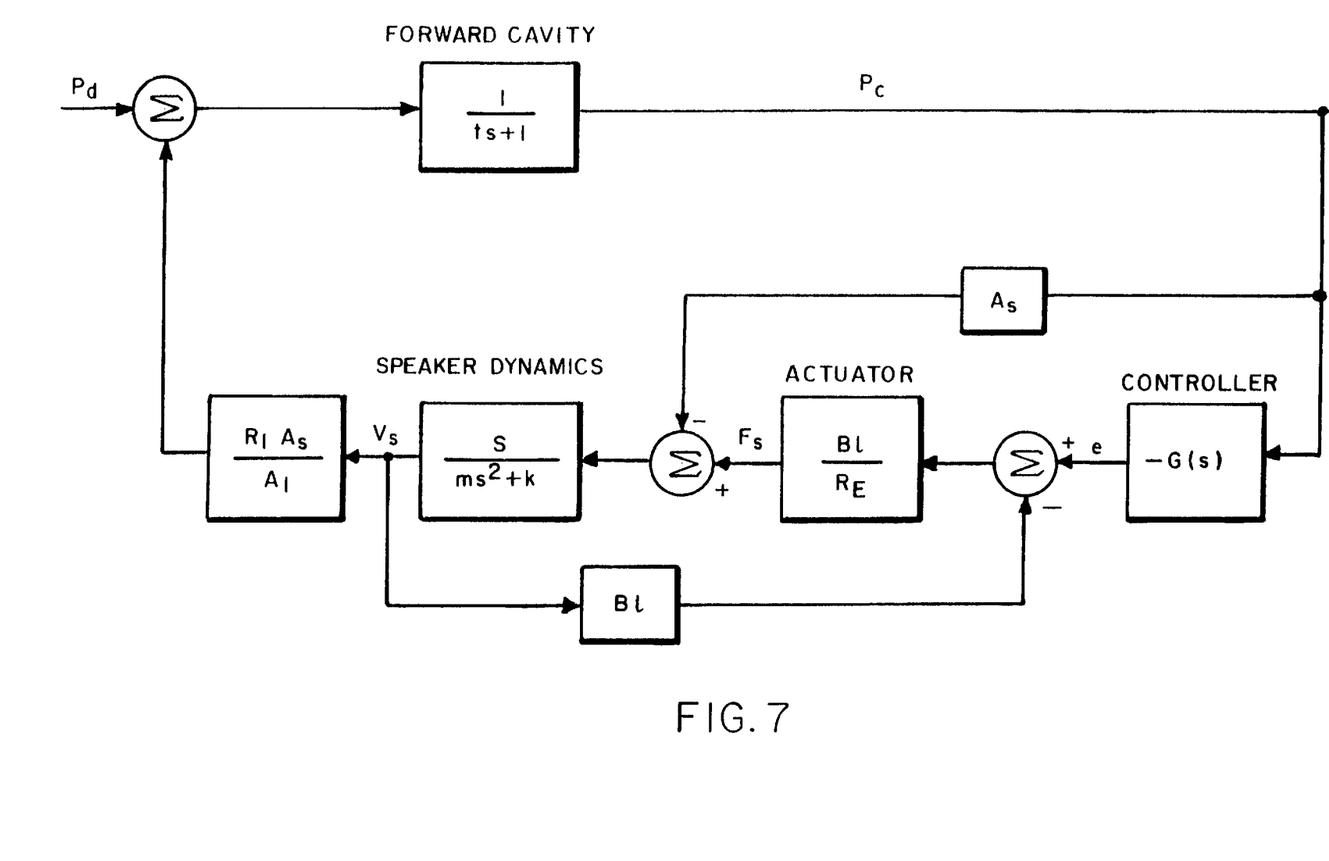
FIG. 7 is a block diagram illustrating the operation of the controller utilized in the active section.

The SISO feedback system shown in FIGS. 3A and 3B can be modeled as illustrated in FIG. 7. In this figure, the sound pressure in the duct passage, $P_d$, is shown as the excitation input and the output, $P_c$, the sound pressure in the forward volume 37 which is to be controlled. The forward (top) path of the block diagram contains the first order function which corresponds to the compliance of the air volume in the forward volume 37 and the resistance of the thin resistive sound absorbing layer 31.

The central branch of the feedback path consists of a controller, G(s), an actuator 45 and the volume 39 behind the speaker. The controller provides about 20 dB attenuation over the low frequency range of interest. For illustrating the principle of this invention in a simple manner, the actuator 45 is modeled in this example as a voice coil loudspeaker. Naturally any other type of actuators that are capable to provide the needed volume displacement can be used in specific realizations. The voice coil generates a force proportional to the magnetic field strength, B, times the coil length, 1, divided by the coil resistance, $R_E$. The box labeled "speaker dynamics" accounts for the mass, m, of the moving components and k for the voice coil suspension stiffness. FIG. 7 also shows two additional loops in the feedback path. The first, containing the parameters $A_S$ (the area of the speaker) accounts for the force applied to the speaker by the acoustic pressure $P_c$ in the forward cavity. This force acts in the same direction as the actuator force and helps to move the speaker cone in the desired direction The second loop, containing the product Bl accounts for the back-electromagnetic-force induced by the moving coil. This effect is also beneficial, as it applies damping to the system. The system block diagram depicted in FIG. 7 is non adaptive. However, an adaptive control system can also be utilized if warranted in cases where system parameters may undergo changes due to change in the operation of the equipment connected to the silencer.

Figure 8:
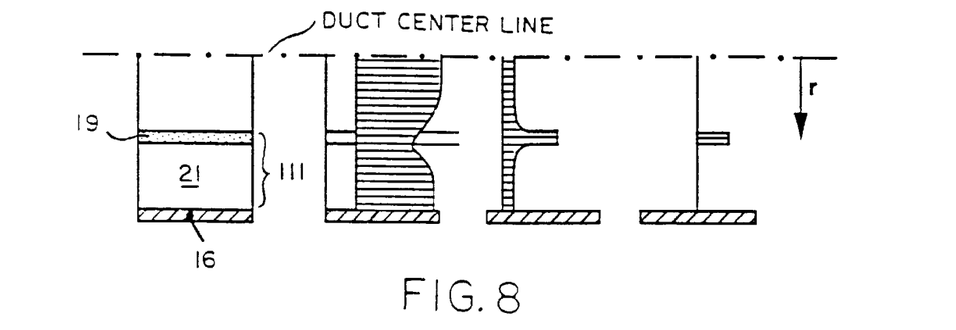
FIGS. 8–10 are diagrams illustrating how sound is dissipated in the different sections of the muffler of FIG. 1.
Figure 9:
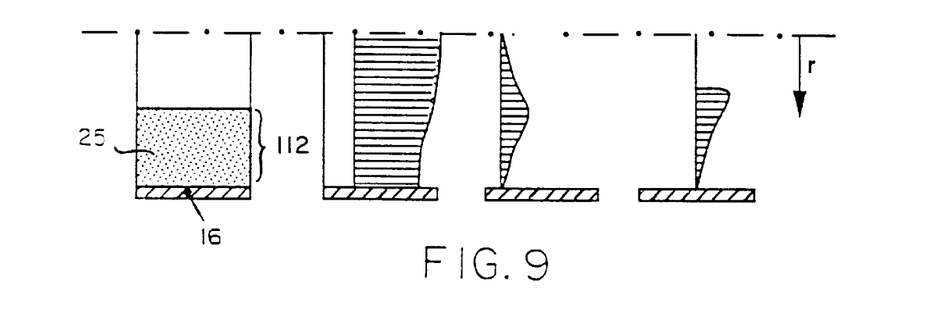
Figure 10:
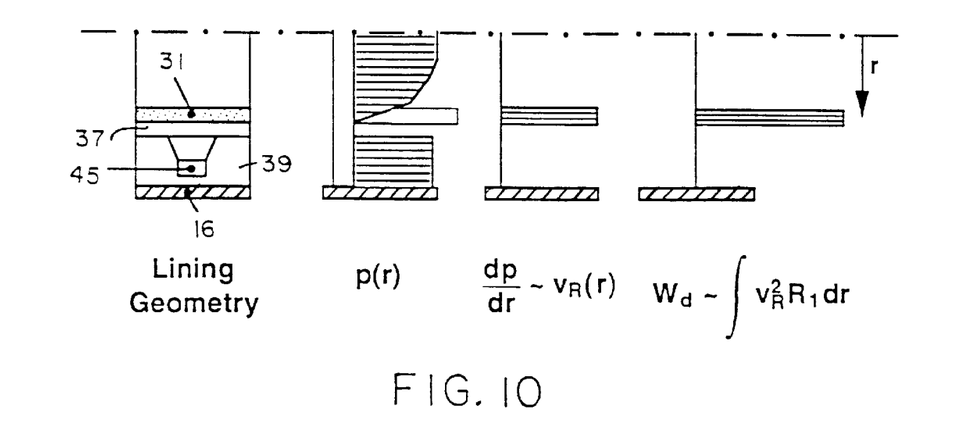

FIGS. 8–10 are useful in comparing and contrasting the operation of the passive muffler sections 11 and 15 with that of the active section 13 at low frequencies where the depth of the liner (111 or 112) is small compared with the acoustic wavelength. One half of the axial section of the passive section 11 and 15 are illustrated in FIGS. 8 and 9 respectively, while that of the active section 13 is illustrated in FIG. 10. In each of these figures the left-most column represents the physical geometry. The next column to the right illustrates the radial distribution of the magnitude of the sound pressure, p(r). The next column to the right illustrates the sound pressure gradient, dp/dr, as a function of the radial position and the right most column illustrates the sound energy dissipated in the corresponding resistive region.

As illustrated in FIG. 8, the first passive section 11 produces a small sound pressure gradient across the resistive layer 19. This is because of the stiffness of the airspace 21 behind that layer. Accordingly, the acoustic energy dissipated in the resistive layer 19 is relatively small.

In the second passive section 15, whose operation is illustrated in FIG. 9, the radial gradient of the sound pressure is distributed through the full depth of the porous layer but, again, the gradient is small and so is the total amount of power dissipated.

As illustrated in FIG. 10 the active system employed in section 13 operates to hold the acoustic pressure just behind of the resistive layer 31 at a low value, though substantial acoustic pressure is generated in the cavity behind the loudspeakers 45, i.e., in the enclosed region 39. However, because of the reduced acoustic pressure in the front cavity 37 just behind of the resistive layer, there is substantial acoustic flow through the layer 31 driven by the pressure gradient across the resistive layer. Accordingly, the power dissipation in the layer 31 is multiplied as illustrated in the right-most portion of FIG. 10.

As indicated previously, an important aspect of the present invention is that the resistive liner or layer which is exposed to the noisy flow has a flow resistance which is substantially less than ρc and which is preferably about 0.3 ρc, the characteristic impedance of the acoustic medium. In the context of a muffler or silencer operating to quiet a noisy gas flow, this characteristic provides a highly advantageous balance between dissipation and the generation of a reflected wave. The essentially resistive wall impedance resulting from the invention is realizable with a much simpler and more robust control system than the theoretically optimal wall impedance of the silencer where both the resistive and the stiffness part of the wall impedance would need to vary with frequency.

Figure 11:
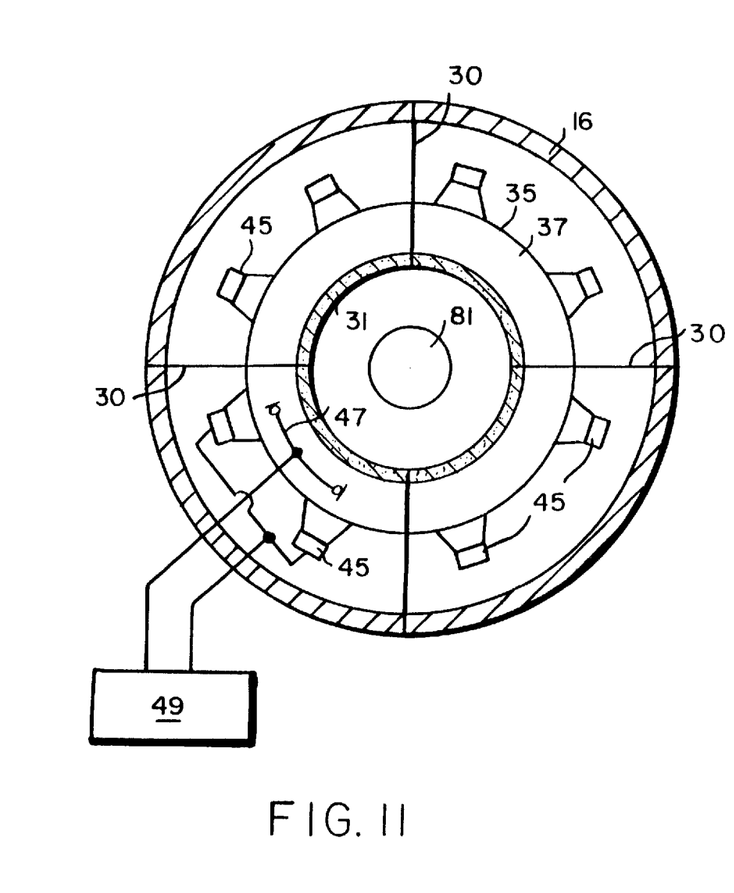
FIGS. 11, 12 and 13 are axial views, in section of the invention of alternative constructions.
Figure 12:
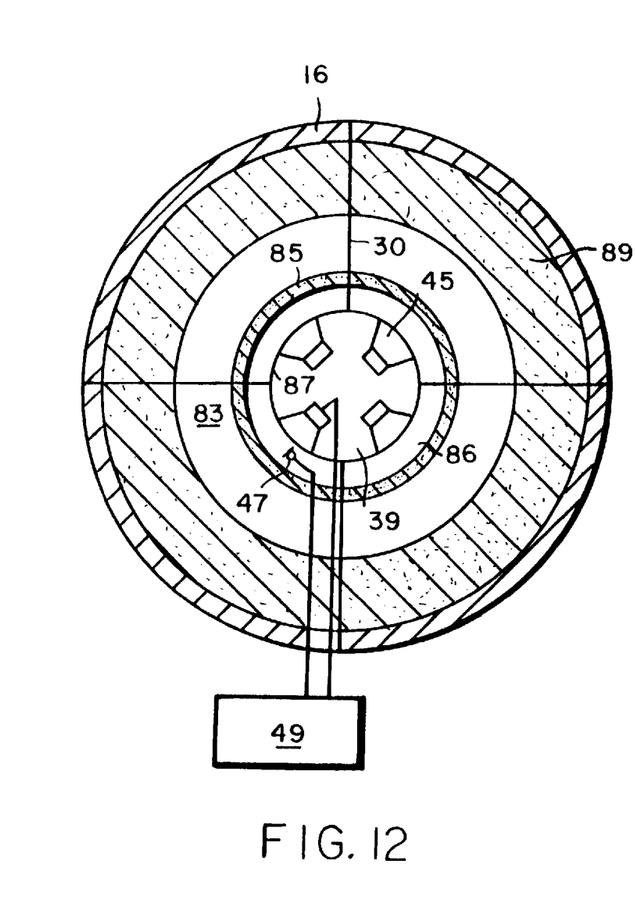

While the duct passage 17 shown in FIGS. 1 and 2 is completely open, it should be understood that either a rigid or sound absorbing center body could be provided, e.g., as indicated by reference character 81 in FIG. 11. Likewise, while the loudspeakers are shown outside the duct passage in FIGS. 1, 2 and 11, an inverted arrangement can also be implemented as illustrated in FIG. 12. In this arrangement, the duct passage 83 is formed as an annular cross section around a central tubular absorbing layer 85 and the actuators 45 are arranged to maintain a low acoustic pressure or high compliance in a region 86 just behind the resistive layer 85. In this arrangement the partition 87 is concentric and of smaller diameter than the resistive layer 85. With this arrangement a thick resistive layer 89 may be provided on the outer shell 16.

Figure 13:
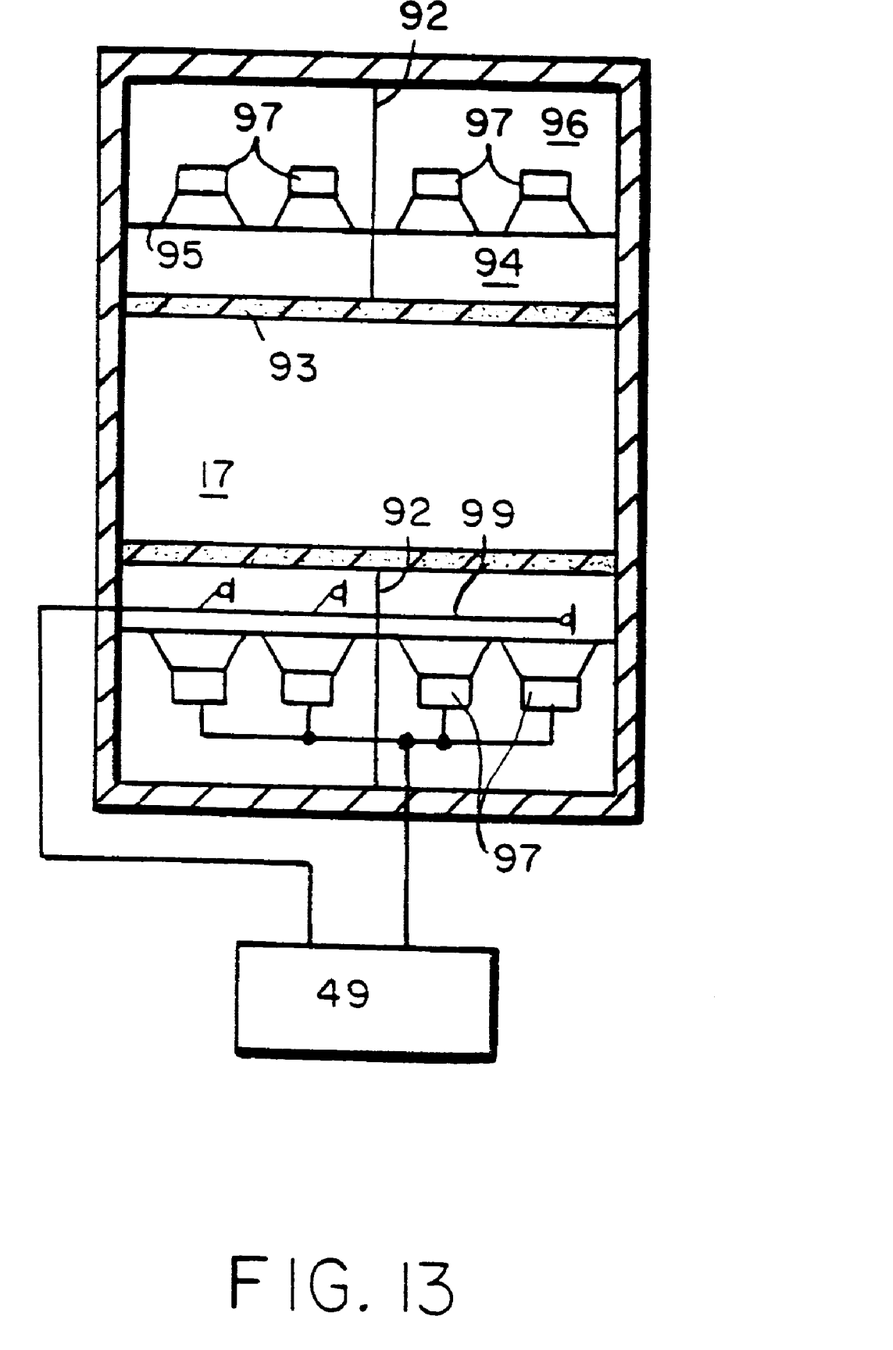

Likewise, while round ducts are more conventional, rectangular ducts may also be used in appropriate circumstances as illustrated in the cross sectional view in FIG. 13. In this arrangement, each of the resistive layers is a flat panel 93. Again, a space outside of each panel 93 is partitioned axially in planes perpendicular to the duct axis to inhibit axial propagation of sound in the liner. The partition 95, oriented parallel to the duct axis, divides each axial section of the airspace into a first or front portion 94 and a second or back portion 96 in a manner similar to the round geometry shown in FIG. 2. The partition 92 is employed if higher order duct modes must be attenuated. The actuators 97 are energized in response to signals picked up by microphones 99 so as to minimize the sound pressure in the spaces between each resistive panel 93 and the respective partition 95.

Figure 14A:
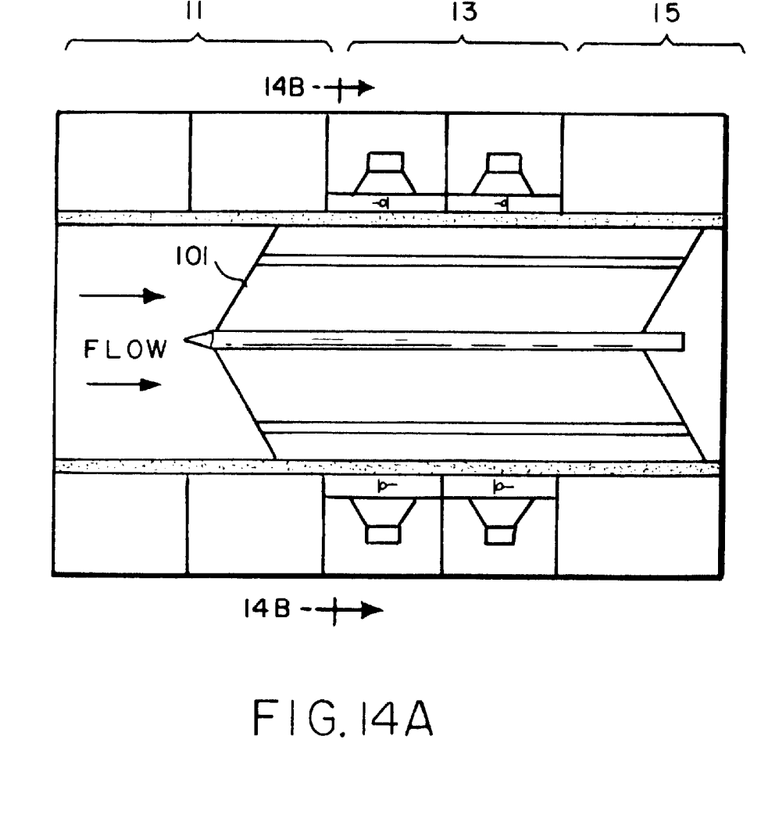
FIGS. 14A and 14B are views illustrating a muffler in accordance with the present invention incorporating radial partitioning of the flow passage.
Figure 14B:
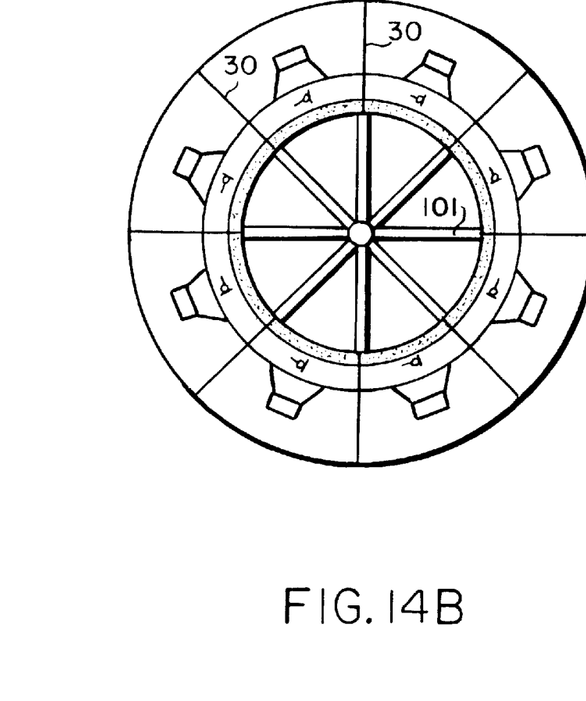

While the ducts cross sections shown in the prior embodiments are fully open, in some circumstances it may be advantageous to radially partition the duct. This can be accomplished as illustrated in FIGS. 14A and 14B by an insert 101 comprising a series of radially extending plates. This insert operates to break up large eddies before they reach the active section where they would create large convected pressure patterns which would be difficult to distinguish from low frequency acoustic noise. The insert also stops flow swirl which also carries large eddies and it also "kills" all acoustic spinning modes. Since the insert subdivides the cross-section of the passage into smaller areas, only plane wave can propagate in each of the so-created, pie-shaped passages up to much higher frequencies than in the round unpartitioned cross-section. This makes active control possible up to much higher frequencies. The insert also nearly completely decouples peripherally each active liner section from each other, particularly it decouples each active liner section from others which are upstream or downstream but not in the same pie-shaped passage.

Preferably the insert 101 incorporates swept leading edge and trailing edge of the plates to reduce flow-generated leading edge and trailing edge noise. Also, the leading edge of the plate assembly is sufficiently upstream of the active section so that flow noise generated there is attenuated by the passive liner before it reaches the active section. Also the large eddies "cut" by the leading edge have sufficient passage time to decay before reaching the active section. The trailing edge is preferably downstream of the active section so that flow-generated trailing edge noise is attenuated by the passive liner before it can "creep" upstream to the active section. The trailing edge also can be made porous or serrated to reduce the intensity of the trailing edge noise generation.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for reducing acoustic energy in a gaseous acoustic medium traversing a duct passage, said apparatus comprising:

a porous resistive member having a first side defining a wall of said duct passage;

a chamber on a second side of said porous resistive member opposite said duct passage;

a partition dividing said chamber into a first volume adjacent said porous resistive member and second volume separated from said porous resistive member, said partition comprising at least one aperture;

at least one acoustic driver transducer mounted in said at least one aperture in said partition;

at least one sensing transducer responsive to acoustic pressure, said at least one sensing transducer located in said first volume of said chamber;

a controller responsive to said sensing transducer for actuating said at least one acoustic driver transducer so as to reduce acoustic pressure variation in said first volume of said chamber and thereby increase acoustic flow from said duct passage through said porous resistive member and increase the dissipation of acoustic energy propagating in said duct passage.

2. Apparatus as set forth in claim 1 wherein the flow resistance of said porous resistive member is in the range of 0.1 to 0.5 $\rho c$.

3. Apparatus as set forth in claim 1 wherein said porous resistive member is an insulating material which provides heat section for said transducers.

4. Apparatus as set forth in claim 1 wherein said partition includes a plurality of apertures circumferentially distributed around said duct passage, and an acoustic driver transducer mounted in each of said apertures.

5. Apparatus as set forth in claim 4 wherein said first and second chamber portions are further partitioned perpendicular to the duct axis using a partition extending from an adjacent side of a circumferential partition forming said first volume to the side of said resistive member opposite said duct passage to inhibit axial transmission of sound behind said porous member.

6. Apparatus as set forth in claim 4 wherein said first and second chambers are further radially partitioned in planes parallel to the duct axis to inhibit circumferential transmission of sound behind the said porous member, and have respective driver and sensing transducers.

7. Apparatus as set forth in claim 1 wherein duct said passage is radially partitioned to prevent swirl of the medium traversing the passage.

8. Apparatus as set forth in claim 1 further including at least one passive sound absorbing section fluidly coupled to said duct passage and adjacent to said porous resistive member.

9. Apparatus for reducing acoustic energy in a gaseous acoustic medium traversing a duct passage by an active liner comprising a wall of the said duct passage providing an acoustic wall impedance that has an essentially frequency independent real part and an essentially zero imaginary part whereby the real part of the wall impedance is realized by a thin flow resistive porous layer facing the said passage and the essentially zero imaginary part is achieved by keeping the sound pressure behind the porous layer essentially zero by an active component comprising:

cavities obtained by circumferential and axial partitioning of the liner airspace between the porous layer and the rigid outside wall of the duct, whereby the circumferential partition divides the airspace into a front chamber and a back chamber and the axial partitioning, the purpose of which is to inhibit sound propagation in the liner in the axial direction, subdivide the chambers into individual axial liner segments by running from an edge of said circumferential partition facing said active liner to a side of said active liner opposite said duct passage;

at least one acoustic driver transducer is mounted in an aperture in the said circumferential partition in each of the said axial liner segment;

at least one sensing transducer is located in front chamber that responds to the acoustic pressure in the said front chamber;

a controller responsive to said sensing transducer for actuating said driver transducer in a sense which minimizes the acoustic pressure in the said front chamber and thereby maximizes the acoustic flow through the porous layer and increases the dissipation of acoustic energy propagating in the duct passages.

10. Apparatus as set forth in claim 9 wherein the said circumferential liner cavities are partitioned radially to inhibit sound propagation in the liner in the circumferential direction creating a number of circumferential liner sub-chambers which have no direct acoustic coupling to each other except through the path: porous layer, duct passages, porous layer, and each of the said sub-chambers has:

at least one acoustic driver transducer mounted in an aperture in the said circumferential partition;

at least one sensing transducer located in the front sub-chamber that responds to the acoustic pressure in the said front sub-chamber;

a controller responsive to said sensing transducer for actuating the said driver transducers in a sense which minimizes the acoustic pressure in the said front sub-chamber.

11. Apparatus where the active liner set forth in claim 9 comprises more than one wall of the duct passage.

12. Apparatus as set forth in claim 9 wherein the porous flow resistive layer is an insulating material which provides heat protection for said sensor and driving transducers.

13. Apparatus as set forth in claim 9 wherein the porous flow resistive layer has a flow resistance in the range from 0.1 times to 2 times the characteristics acoustic impedance ρc of the gas in the passage at design temperature where ρ is the density of the gas and c is the speed of sound in the gas at a predetermined temperature.

14. Apparatus as set forth in claim 9 wherein the said passage is radially partitioned to prevent swirl of the medium traversing the passage and to strongly decrease the undesirable coupling between circumferentially adjacent active liner sub-chambers.

15. Apparatus as set forth in claim 9 including passive muffler sections fluidly coupled to said duct passage and adjacent to said active liner.

16. Apparatus for reducing acoustic energy in a duct passage carrying a turbulent flow of a gaseous medium, said apparatus comprising:

a resistive member surrounding said duct passage, the flow resistance of said resistive member being in the range of 0.1 to 2.0 ρc where ρc is the characteristic impedance of said medium at design temperature;

an annular chamber surrounding said resistive member;

a circumferential partition dividing said chamber into a front portion adjacent said resistive member and a back portion outside of said first portion;

a plurality of acoustic driver transducers mounted in apertures distributed around said partition;

at least one sensing transducer responsive to acoustic pressure, said at least one sensing a transducer located in said first portion of said chamber; and a single input single output (SISO) controller for each of the said front-chamber responsive to said sensing transducer for actuating said driver transducers in a sense which reduces acoustic pressure variation in said first portion of said chamber and thereby increases acoustic flow through said resistive member and increases the dissipation of acoustic energy propagating in said duct.

17. Apparatus as set forth in claim 16 wherein said resistive member comprises a fibrous or wool like material, porous layer such as fiber metal or porous ceramic, or a perforated plate with an open area ratio in the range of 1% to 7%.

18. Apparatus as set forth in claim 16 further comprising a central sound absorbing member extending through a portion or through the entire length of said duct passage.

19. Apparatus for reducing acoustic energy in a duct passage carrying a turbulent flow of a gaseous medium, said apparatus comprising:

a first active section and additional active sections each of which includes:

a resistive member surrounding said duct passage; means defining an annular chamber surrounding said resistive member;

a circumferential partition dividing said chamber into a front portion adjacent said resistive member and a back portion outside of said first portion;

a plurality of acoustic driver transducers mounted in apertures distributed around said partition;

at least one sensing transducer responsive to acoustic pressure pressure, said at least one sensing transducer located in said front portion of said chamber; and a multiple input multiple output (MIEO) controller responsive to all of the said sensing transducers for actuating said driver transducers in a sense which reduces acoustic pressure variation in the respective front portions of said chambers and thereby increases acoustic flow through said resistive members and increases the progressive dissipation of acoustic energy propagating in said duct.

20. Apparatus for reducing acoustic energy in a duct passage carrying a turbulent flow of a gaseous medium, said apparatus comprising:

a resistive member surrounding said duct passage, the flow resistance of said resistive member being in the range of 0.1 to 0.5 ρc where ρc is the characteristic impedance of said medium;

means defining an annular chamber surrounding said resistive member;

a circumferential partition dividing said chamber into a first portion adjacent said resistive member and a second portion outside of said first portion;

a plurality of acoustic driver transducers mounted in apertures distributed around said partition;

at least one sensing transducer responsible to acoustic pressure pressure, said at least one sensing transducer located in said first portion of said chamber; and a controller responsive to said sensing transducer for actuating said driver transducers in a sense which reduces acoustic pressure variation in said first portion of said chamber and thereby increases acoustic flow through said resistive member and increases the dissipation of acoustic energy propagating in said duct.

21. Apparatus as set forth in claim 20 wherein said resistive member comprises a fibrous or woollike material, porous layer or a perforated plate with an open area ratio in the range of 1% to 7%.

22. Apparatus as set forth in claim 20 further comprising a central sound absorbing member extending through at least a portion of said duct passage.

23. Apparatus for reducing acoustic energy in a duct passage carrying a turbulent flow of a gaseous medium, said apparatus comprising:

a first active section and a second active section each of which includes:

a resistive member surrounding said duct passage;

means defining an annular chamber surrounding said resistive member;

a circumferential partition dividing said chamber into a first portion adjacent said resistive member and a second portion outside of said first portion;

a plurality of acoustic driver transducers mounted in apertures distributed around said partition;

at least one sensing transducer responsive to acoustic pressure pressure, said at least one sensing transducer located in said first portion of said chamber; and a multiple input multiple output (MIMO) controller responsive to said sensing transducers for actuating said driver transducers in a sense which reduces acoustic pressure variation in the respective first portions of said chambers and thereby increases acoustic flow through said resistive members and increases the progressive dissipation of acoustic energy propagating in said duct.

* * * * *